S. E. LANE.
ROD AND TOOL COUPLING.
APPLICATION FILED NOV. 17, 1919.
1,415,658.
Patented May 9, 1922.
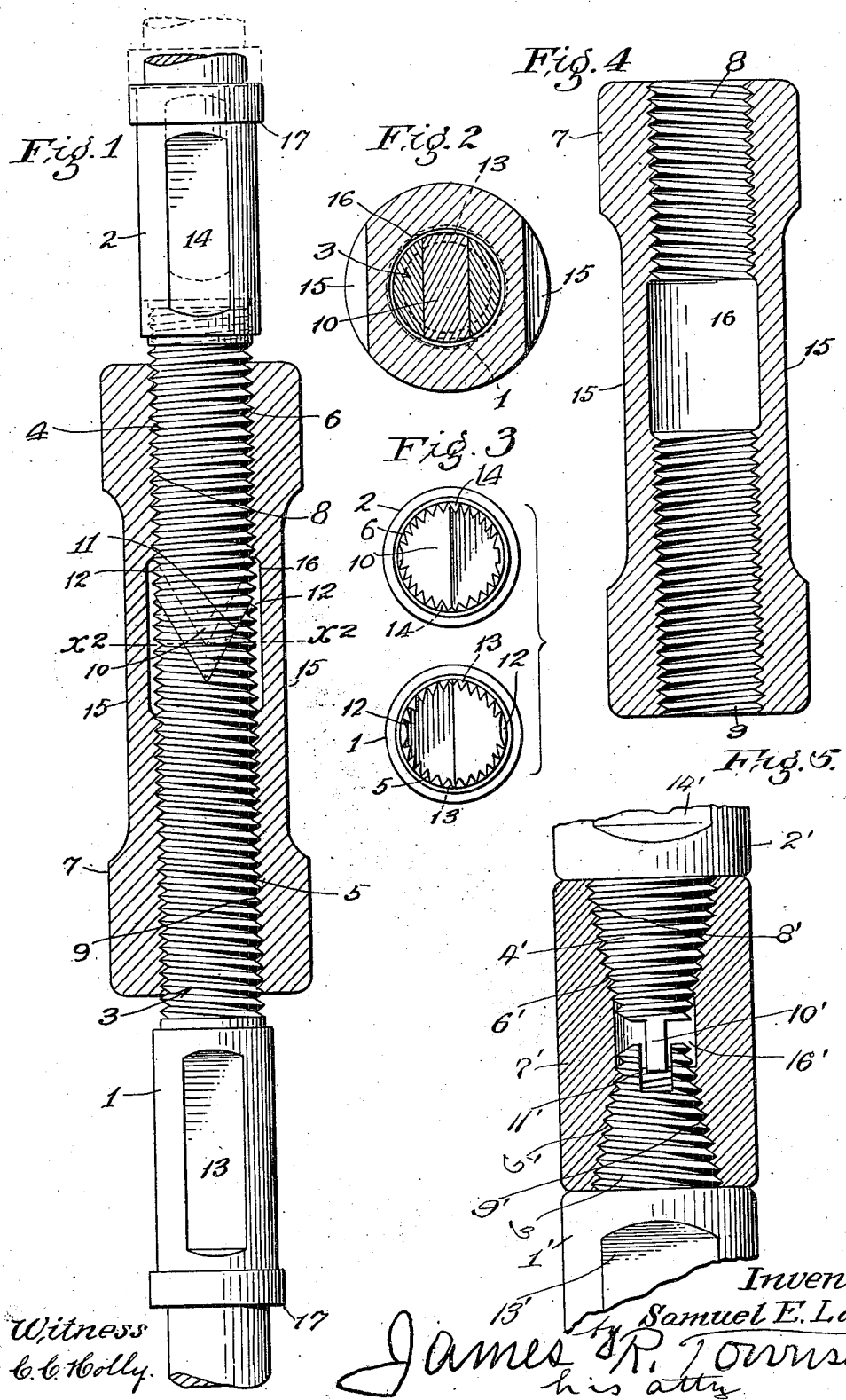

UNITED STATES PATENT OFFICE.

SAMUEL E. LANE, OF SANTA ANA, CALIFORNIA, ASSIGNOR OF ONE-HALF TO WILLIAM BAKER, OF SANTA ANA, CALIFORNIA.

ROD AND TOOL COUPLING.

1,415,658.   Specification of Letters Patent.   Patented May 9, 1922.

Application filed November 17, 1919. Serial No. 338,780.

*To all whom it may concern:*

Be it known that I, SAMUEL E. LANE, a citizen of the United States, residing at Santa Ana, in the county of Orange and State of California, have invented a new and useful Improvement in Rod and Tool Couplings, of which the following is a specification.

An object of this invention is to provide a coupling for detachably connecting two sections so that they will not be subject to accidental disconnection.

The invention is particularly applicable to uniting sections of the sucker rods of deep oil well pumps. In this class of sucker rods the sections are united by a box and pin on the ends of the rods and are lowered into the well in suitable lengths together with the pump tubing which is also made in sections connected by screw threaded couplings. When the sucker rod and tubing are properly installed, the pumping is effected by reciprocating the rod which carries a sucker or piston at its lower end. Such sucker rods are operated in wells ranging from a few hundred feet to four thousand feet or more in depth and owing to the tendency of the pump, piston and sucker rod to float, there results a vibration of the rod during reciprocation which results from time to time in unscrewing the joint between the rod sections. Such unscrewing of the joint may occur several thousand feet below the surface of the ground and the detached portion of the rod must be removed by a very tedious operation, the pump tubing also having to be drawn to gain access to the part of the rod which remains in the well. This operation requires much time and is expensive and stops the production of the well during the time consumed.

This improvement relates to rods in which the unscrewing of the joints is made impossible except upon such diverse application of external force independently to each of three elements making up the joint, as can be effected only by three separate tools, thus precluding accidental dismemberment at any joint and an object of the invention is to make provision whereby the connecting or disconnecting of the parts of the joint for separation of the two parts united thereby may be quickly performed without such disarrangement of parts as will retard the operation of re-coupling them together.

The invention is applicable to tools used in boring oil and other wells and is also applicable for connecting rods and other elements for either reciprocation, oscillation or torque.

The threaded parts of the two bodies to be united may be variously constructed and this is also true with respect to the elements that go to make up the slip joint.

Two forms of threaded pins and two forms of slip joints will be shown as illustrative of the principle of this invention.

Other objects, advantages and features of invention may appear from the accompanying drawing, the subjoined detail description and the appended claims.

The accompanying drawing illustrates the invention.

Figure 1 is an elevation of a joint constructed in accordance with this invention as adapted to coupling together two sections of a reciprocating sucker rod. The coupling collar is shown in axial section. Dotted lines indicate a position of parts when the coupling is partly unscrewed.

Fig. 2 is a transverse section of the coupling on line $x^2$, Fig. 1.

Fig. 3 is an end view of the two screw threaded pins detached.

Fig. 4 is an axial section of the coupling.

Fig. 5 is a fragmental view, partly in section, of a tool coupling constructed in accordance with this invention.

1 and 2 represent two sucker rod bodies provided respectively with pins 3, 4 which are complementary to each other.

It is understood that in sucker rod construction each section of sucker rod is provided at one end with one of these pins and at the other end with the other one. The pin 3 is provided with a left hand thread 5 and the pin 4 is provided with a right hand thread 6. The ends of the complementary pins of the two bodies 1, 2, are joined together by a slip joint adapted to allow movement of the bodies relative to each other longitudinally of the axis of said pins, so as to allow the slip joint to be connected and disconnected by reverse endwise movement of the bodies. The slip joint may be variously constructed, all that is necessary being to thereby insure against relative rotation of the two pins when the joint is completed.

The coupling 7 is provided with right and left hand threads 8, 9 and the length of the coupling is sufficient to accommodate the threaded portions of the two pins when said pins are jammed together with their slip joint fully articulated as shown in Fig. 1.

In Figs. 1, 2 and 3 the slip joint of the pins is shown formed of a wedge 10 and a V shaped seat 11 forming a male and female V-connection within which the wedge 10 is driven home by rotating the coupling on the pins engaged therewith. The wedge 10 may be effective to spread apart the tips of the prongs 12 of the seat for the wedge. Forming the pins with male and female V-connections makes it possible to form the pins by striking them up in a die.

Each lower member of each joint is adapted to be held against rotation during the operation of connecting or disconnecting the joint and to this end the wrench faces 13, 14 and 15 on the rod bodies and the coupling respectively are provided for this purpose.

The coupling conceals the slip joint when the pins are inserted, and it is therefore necessary to the practical application of this invention that there be some external indication whereby the operator may know when the members of the slip joint are in position to be united; and with this object in view the plain wrench faces 13, 14, of the members provided with the pins are arranged in a pre-determined position relative to the slip joint members 10 and 11 for the opposed pins. It is preferable that said faces for the bodies be correspondingly arranged relative to the slip joint members so that when the wrenches, not shown, are applied to the wrench faces of the rod sections and their handles are extended and brought to corresponding positions, the slip joint members 10 and 11 will be in position to allow the joint to be united so as to prevent relative rotation of the bodies.

In practice a free space 16 is provided to accommodate the engaging members of the slip joint and pins.

Such free space is preferably formed by a counter bore within the collar 7, the purpose being to allow relative longitudinal movement of the pins after their ends are lapped and to provide space for the accommodation of fluids, as oil and air, which otherwise might interfere with the drawing of the male and female V-connections together. Relative rotation of the bodies is possible until the coupling has been sufficiently screwed upon the two pins to cause the slip joint members to lap. When the pins are nearly entered to such point the operator may bring the wrench seats 13, 14 to position indicated for union of the slip joint and a further rotation of the coupling causes the ends to articulate with each other and by screwing the coupling home, the ends of the pins are jammed tightly against each other. Then the wrenches are removed.

In order that the joint thus formed may be loosened; it is necessary to maintain the two rod bodies relatively non-rotatable and to cause relative rotation between such bodies on the one hand and the coupling on the other hand while allowing axial movement of the bodies and coupling relative to each other.

The conditions thus necessary for loosening the joint do not occur in the usual operation of rod sections or other connected bodies under reciprocatory, oscillatory, rotary or vibratory movements and consequently the joint will remain tight under all operating conditions.

In Fig. 5 the parts corresponding in function to parts shown in the other view are indicated by a like reference character with an exponent. The tongue 10' is flat faced and seats in the angular socket 11'. The threaded pins 3' and 4' are taper instead of cylindrical as in Fig. 1.

The faces and edges of the pin joint at the sides of the wedge 10 and V-shaped seat 11 are so arranged in combination with the threaded portions of the pins, the threads 8, 9 and faces 15 of the coupling that when the parts are all screwed home the faces 13 and 14 of the two rods will be in a predetermined position relative to the faces 15 of the coupling. In Fig. 1 such predetermined position is shown as planes of the wrench seats 13, 14 being at right angles to the planes of the wrench seats 15.

I do not limit the invention to the two modifications shown, but may apply the same in such various forms as may be obvious to the mechanic skilled in the art without departing from the principle herein disclosed.

The sucker rod joint is preferably so constructed that the coupling collar will entirely unscrew from one pin before unscrewing from the other, and to this end one pin, preferably the lower left-threaded pin of each joint is longer than the other pin, and the threaded seat for the longer pin is correspondingly longer than the seat for the other pin. Consequently the free space between the threaded seats is nearer one end of the coupling than the other.

Each rod is provided at each end with a shoulder 17 and in practice, the coupling collars will be screwed part way upon the longer pins of the several rod sections and when the lowermost section with the sucker or lifting valve thereon is to be inserted into the pump, tube, the usual elevators, not shown will be caught under the shoulder 17 and the rod section will be handled in the usual way and lowered until the coupling at the long pin is accessible for receiving the short pin of the next section. Such section will then be brought into position for screwing its short pin into the coupling and will then be screwed down until the ends of the pins are at about the same horizontal plane.

Then wrenches will be used on each of the three parts and while the wrenches on the upper and lower sections of the rod are held in position to bring the slip joint members into articulating position the wrench on the coupling is operated to move the rod sections endwise toward each other until they are jammed together.

The operation is repeated with succeeding rod sections until the entire rod is in place in the well. It is understood that the joining and lowering of the pump tubing in lengths to suit is conducted in the usual way and that usually when pulling a pump, it will be preferred to only separate every third joint if the well rig, not shown is adapted to handle such lengths of rod and tubing.

I claim:

1. A coupling for sucker rods comprising right and left threaded pins provided at their ends with male and female V-shaped members adapted to slip endwise into engagement with each other to prevent relative rotation, and a collar internally threaded with right and left hand screw threads and adapted to be connected to said members to bring said members into and out of engagement with each other for the purpose of preventing disconnection of the members except when rotation of the collar relative to both such members alike, or vice-versa, is effected; said rods and said coupling being provided with plane wrench faces arranged in predetermined position relative to the slip joint members so that when wrenches are applied to the wrench faces of the sections, and their handles are extended to predetermined positions, the slip joint members will be in position to allow the joint to be united so as to prevent relative rotation of the bodies.

2. A coupling comprising pins having at their ends complementary portions adapted to inter-lock and prevent relative rotation of said pins; means for drawing said pins together; and pairs of wrench faces so positioned on said pins that, when the faces on one pin are each in alinement respectively to the faces on the other pin, the complementary portions will also be in position to be brought into interlocking relation with each other.

3. A coupling comprising rods having pins formed on the ends thereof; the ends of said pins being provided respectively with male and female members adapted to interlock to prevent relative rotation of the rods; means for drawing the male and female members together; a single pair of wrench faces on each of said rods so positioned thereon that when each of the wrench faces on one rod are alined respectively with each of the wrench faces on the other rod the male and female members will also be in alinement.

4. A coupling comprising pins having at their ends complementary portions adapted to be brought into inter-locking relation with each other; a collar for drawing said pins into inter-locking relation; and means on each of said pins for positively indicating the angular position of said complementary portions relative to each other while being drawn together by said collar.

In testimony whereof, I have hereunto set my hand at Los Angeles, California, this 27th day of October, 1919.

SAMUEL E. LANE.

Witness:
JAMES R. TOWNSEND.